Patented July 15, 1952

2,603,569

UNITED STATES PATENT OFFICE 2,603,569

EFFERVESCENT DRINK CONCENTRATE

Joseph G. Alther, Evanston, and Prudence M. Van Arsdell, Chicago, Ill.

No Drawing. Application January 23, 1950, Serial No. 140,159

28 Claims. (Cl. 99—78)

This invention relates to concentrates useful for the production of effervescent drinks, a method for the production of such concentrates, ingredients which may be employed in the production of such concentrates, and processes for the preparation of those ingredients. Primarily the invention relates to concentrates useful in the production of confectionary beverages.

There are known to the prior art numerous powdered and granulated compositions suitable for preparing soft drinks. These prior art compositions are primarily combinations of citric acid with a carrier, color and a flavor. Such compositions do not produce effervescent drinks. Bottled soft drinks which have been carbonated by conventional procedures and which when uncorked release carbon dioxide are also well known to the art.

It is the purpose of this invention to produce a dry, powdered or granulated composition which may be added to water to produce an effervescent drink similar to the aforementioned bottled, carbonated beverages. The characteristics which are desired in such effervescent drinks are, among others, (1) sufficient sweetness for palatability, (2) proper color and flavor, (3) clarity and sparkle, (4) substantial effervescence, (5) the retention of effervescence during the period the drink is being consumed, and (6) in the case of beverages having fruit flavors, acidity comparable to the natural fruit juices.

The production of a concentrate which, when added to water, will produce a drink having all of the aforementioned characteristics is attended by numerous problems. Conventional methods utilized for the production of effervescent pharmaceutical preparations such as Alka-Seltzer, may not be employed. Such pharmaceutical compositions are simple, stabilized combinations of acid and carbonate which contain little or no sugar. The combination of these ingredients presents no storage problem so long as the material is maintained in a dry state. When added to water, these compositions evolve carbon dioxide at an extremely high rate. The solution produced is predominantly saline and medicinal in taste. The effervescence is quickly dissipated.

Compositions comprising simple mixtures of carbonates, acids, and sugar, on the contrary cannot be stabilized. When these materials in their normal state are combined, many different reactions occur. The acid, conventionally citric acid, reacts with the sugar to form dextrose and levulose. The carbonates tend to destroy the flavor and adversely to affect the color of the composition. There is no appreciable shelf-life inherent in such mixtures for the reason that the aforementioned reactions continue in the package or container with the result that the product has little or no effervescent activity and has an undesirable appearance and taste at the time of use. Furthermore, the moisture from the atmosphere or the water of crystallization of the citric acid is sufficient to initiate and maintain these degradation reactions. The degradation is expedited by the levulose formed in the process which is highly hygroscopic and continues absorption of moisture until the entire mixture becomes a damp, syrupy mass.

The beverage concentrates of this invention are characterized by great stability in storage and, when added to water, produce a highly palatable, healthful, effervescent drink. Furthermore, the products of this invention when added to water demonstrate a delayed effervescence maintained throughout the time the drink is consumed.

In accordance with this invention each of the basic ingredients of the effervescent drink composition is separately converted to such form that the particular function thereof in the final mixture is maintained in storage for an indefinite period of time without appreciable loss of activity, palatability, color or flavor. The basic ingredients which are separately prepared include (a) an acid-disaccharide complex, (b) a carbonate-disaccharide complex, and (c) a flavor-sugar complex. All of these complexes are preferably prepared from a disaccharide or sugar which has previously been uniformly colored in conventional manner with a food dye.

THE ACID-DISACCHARIDE COMPLEX

It is the primary purpose of this aspect of the invention to produce a complex of an edible crystalline organic acid and a disaccharide which is stable in the presence of carbonates and the carbonate-disaccharide complexes described hereinafter, but which, when added to water, will dissolve and produce an acidity sufficient to release carbon dioxide from carbonates and carbonate containing materials. It has been discovered that acid-disaccharide complexes which comprise essentially disaccharide crystals having a quantity of edible organic acid bound to the surface thereof are characterized by these desired properties.

Such acid disaccharide complexes are produced in accordance with this invention by heating to a temperature of from about 125° F. to 250° F., a mixture of an edible organic acid and a sugar in the presence of such an amount of water that a partial inversion of the disaccharide is effected on the surfaces of the crystals thereof. This partial inversion produces monosaccharides which act as binding agents for the acid present.

It has further been discovered that satisfactory acid-disaccharide complexes may be prepared from a mixture of dry organic acid hydrates and dry disaccharides, the only moisture present in the original mixture being that inherent in components as water of hydration. Presumably this water of hydration effects inversion of the surfaces of the disaccharide crystals in a manner analogous to that shown in the following equation in which citric acid hydrate and sucrose are employed as reactants.

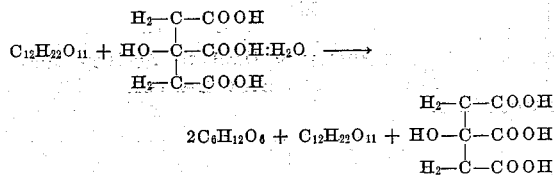

In the acid-disaccharide complex formed, the acid is uniformly distributed over the surface of the disaccharide. The product is substantially free of separate or unbound citric acid. The product readily air dries to a glassy, crystalline granular material which is stable on storage in air tight containers. The water solubility of the acid-disaccharide complexes is generally greater than that of either the disaccharide or the acid alone.

As indicated in the ensuing examples, the ultimate temperature to which the mixture is raised is of primary significance rather than the maintenance of the mixture at any particular temperature for any specific period of time. The most desirable ultimate temperature to which any particular acid-disaccharide mixture should be heated is a function primarily of the relative quantities of the two ingredients which are present therein. In general, as the ratio of disaccharide to acid is increased, progressively higher temperatures are required to produce a satisfactory reaction product. Other factors which exert some influence upon the proper ultimate reaction temperature are the total quantity of ingredients undergoing reaction, the size of the disaccharide and acid crystals employed, and the presence of any residual moisture other than water of hydration in the reactants.

It is desirable that the interior of the disaccharide crystal be not materially modified by the formation of the complex. Accordingly the reaction between the acid and disaccharide is preferably terminated when sufficient monosaccharides have been produced by inversion to bind the acid to the surface of the disaccharide crystal. The proper degree of reaction is readily susceptible to visual determination. A satisfactory product is semi-plastic in consistency while hot and is substantially free of uncombined citric acid. Many of the disaccharide granules retain their individual identity. Water is released as the reaction proceeds; hence if the reaction is not terminated at the proper time, the mixture may be converted to syrupy fluid which often appears caramelized.

It should be understood that there is no precise critical point at which the reaction between the acid and disaccharide must be terminated. It is essential however that a partial inversion only of the disaccharide be effected. Such inversion occurs throughout a wide range of temperatures. Generally, a satisfactory product may be produced by raising an organic acid-disaccharide mixture to a temperature within the range of from about 125° F. to 250° F. The preferred temperature range is from about 150° F. to about 200° F.

The formation of the acid-disaccharide complexes is preferably carried out in an inert atmosphere to preclude oxidation and other adverse effects upon the reactants and product, and to preclude fading of the dye present in the disaccharide.

The organic acids which may be employed in the formation of the acid-disaccharide complexes of this invention include the edible organic acids. Thus citric, tartaric, malic, and similar acids may be employed. The normally crystalline organic acids and particularly citric acid are preferred.

The acids may be utilized either in the hydrated or anhydrous form. As previously indicated, the water of hydration of the hydrated forms of the acid is adequate to effect the partial inversion of the disaccharides, hence no additional water need be added to hydrated acid-disaccharide reaction mixtures. The hydrated acids are therefore preferred.

When the anhydrous acids are employed, a small amount of water is preferably included in the mixture from which the acid disaccharide complex is formed. It has been found that water in an amount equal to from about 5% to about 15% of the anhydrous acid may satisfactorily be employed. Preferably, water in an amount equal to from about 7% to 10% of the weight of the anhydrous acid is utilized.

Advantageous results are also obtained by the reaction of a dry mixture of hydrous and anhydrous acids with a dry disaccharide. Such mixtures containing as much as about 65% by weight of the anhydrous form of the acid may readily be so employed. It is preferred however that the anhydrous acid constitute from about 25% to about 50% by weight of the acid mixture. Higher ultimate reaction temperatures are required when mixtures of anhydrous and hydrated acids are employed as reactants. This result is advantageous in that the complex formed is less reactive, a better dispersion of moisture is obtained, less moisture is required, and less accurate control is necessary.

The disaccharides as a class are inverted by acids, and accordingly are generically operable in the formation of both the acid and the carbonate complexes of this invention. The common disaccharides which are illustrative of those which may be employed in the invention include sucrose, trehalose, maltose, lactose, cellobiose, gentiobiose, and melibiose. Sucrose is preferred. These disaccharides fall into three classes with respect to the point of glycosidic union, namely, (1) those linked through reducing groups, (2) the $C_4$ disaccharides, linked through the carbon four of the alcohol portion, and (3) the $C_6$ disaccharides linked through the carbon six of the alcohol portion.

The classification of the aforementioned disaccharides, the inversion products thereof, and the relative sweetness of the inversion products as compared with sucrose rated as 100 in sweetness are set forth in the following table.

*Table I*

| Disaccharide Class | Members of Class | Inversion Products, Monosaccharides formed on inversion | Sweetness Index of Inversion Products |
|---|---|---|---|
| (1) linked thru reducing groups. | Sucrose | Glucose | 74.3 |
|  |  | Levulose | 173.3 |
| (2) C₄ Disaccharides | Trehalose | 2 Glucose | 74.3 |
|  | Maltose | 2 Glucose | 74.3 |
|  | Lactose | Glucose | 74.3 |
|  |  | Galactose | 32.1 |
| (3) C₆ Disaccharides | Melibiose | Glucose | 74.3 |
|  |  | Galactose | 32.1 |
|  | Gentiobiose | 2 Glucose | 74.3 |

The edible organic acids and disaccharides may be combined in wide ranges of proportions to produce the complexes of this invention. A preferable range is from about equal parts of each ingredient to about one part of acid to about 5 parts of disaccharide.

The following examples are indicative of the preparation of the acid-disaccharide complexes in accordance with this invention. All parts are by weight unless otherwise indicated.

EXAMPLE I 22 parts of citric acid monohydrate and 50 parts of dry, dyed sucrose were intimately mixed and placed in a closed vessel. The closed vessel was then placed in an oven maintained at a temperature of about 250° F. and permitted to remain therein until the temperature of the acid-sugar mixture had raised to about 175° F. The closed vessel was then removed from the oven and the contents thereof, which were damp and semi-plastic, were spread in an open pan and allowed to cool and dry at room temperature. The product of the reaction became hard and dry in a few minutes and was then passed through a ten mesh screen to produce granules of uniform size.

EXAMPLE II

A series of five simultaneous experiments were carried out in which the proportion of citric acid monohydrate to sucrose varied from 1:1 to 1:5. In all instances, the citric acid and sucrose were thoroughly mixed and placed in closed vessels which were simultaneously inserted into an oven maintained at a constant temperature of 224° F. The time required to obtain a satisfactory reaction between the citric acid and the sugar and the ultimate temperature at which such reaction was achieved in each of these samples is indicated in Table II.

*Table II*

| Acid-Sucrose Ratio | Satisfactory Reaction T. | Time Required to Reach Reaction T. |
|---|---|---|
|  |  | *Minutes* |
| 1:1 | 164 | 40 |
| 1:2 | 172 | 50 |
| 1:3 | 182 | 57 |
| 1:4 | 184 | 65 |
| 1:5 | 184 | 75 |

It was noted that the water of crystallization of the citric acid had rendered the samples moist within ten minutes after they had been placed in the oven. At this time the samples had reached a temperature of approximately 110° F.

It is apparent from the foregoing that as the ratio of sucrose to acid is increased, higher ultimate temperatures are required to produce a satisfactory product.

After determining the time required to produce a satisfactory reaction product for each of the samples shown in Table II, the samples were kept intact and raised to a temperature in excess of 200° F. In all instances, the material was converted by such additional heating to a syrupy product which was caramelized in appearance. This product, when poured while hot into an open pan and allowed to remain for twenty-four hours under normal atmospheric conditions, became hard and somewhat brittle.

EXAMPLE III

The procedure described in Example II was repeated with the exception that in this instance the five samples were heated in a water bath maintained constantly at a temperature of about 212° F. The results of these experiments are set forth in Table III.

*Table III*

| Acid-Sucrose Ratio | Satisfactory Reaction T. | Time Required to Reach Reaction T. |
|---|---|---|
|  |  | *Minutes* |
| 1:1 | 172 | 18 |
| 1:2 | 176 | 20 |
| 1:3 | 178 | 25 |
| 1:4 | 178 | 30 |
| 1:5 | 178 | 33 |

The contents of each of the five closed vessels employed were removed when it appeared by physical observation through the glass bottle that a satisfactory reaction product had been obtained. The samples when removed from the closed reaction vessels were moist, slightly sticky and somewhat granular in character. When placed in open pans under normal atmospheric conditions and cooled by an electric fan, the samples began to dry and became somewhat hard and sandy within ten minutes. After about one hour each sample was dry, glassy, and hard and the product was screened through a ten mesh sieve to produce granules of uniform size.

It will be noted from the data appearing in Table III that as a consequence of the more uniform heating achieved from the water bath as compared with the oven employed in Example II satisfactory reaction products were obtained in a much shorter period of time. It follows therefore that raising of the acid sugar mixture to a proper temperature is of significance and that mere maintenance of such a mixture at any particular temperature is of lesser importance.

This conclusion is illustrated by the fact that the increase in moisture of the citric acid hydrate-sugar mixture is progressive from a dry state at atmospheric temperature to a syrupy or plastic state at substantially higher temperatures. Moisture begins to appear when citric acid monohydrate-sucrose mixtures are heated in closed vessels to mixture temperatures of about 110° F. The appearance of moisture increases with the temperature until, if the action is prolonged, the material is converted completely to a fluid state. The following two examples are illustrative of the increase in moisture content as the temperature is raised, and in addition constitute a comparison of the merits of carrying out the reaction in closed and in open containers.

EXAMPLE IV

A mixture of 18.9 parts of citric acid monohydrate and 50 parts of sucrose were placed in an uncapped bottle, and heated to a temperature of about 170° F. in an oven maintained at a constant temperature of about 224° F. The various visible changes occurring in the mixture as the temperature thereof was raised are set forth in Table IV.

Table IV

| Temp. °F. | Elapsed Time (min.) | Comments |
|---|---|---|
| 76 | 0 | The temperature of the mix was taken on initial dry ingredients at room temp. |
| 90 | 8 | Still dry. |
| 98 | 13 | Very slightly moist. |
| 105 | 18 | Slight increase in moisture. |
| 110 | 23 | Do. |
| 110 | 28 | Slight increase in moisture, acid crystals very apparent. |
| 110 | 35 | Slight increase in moisture, slight decrease in evident acid crystals. |
| 118 | 43 | Slight increase in moisture, substantial amount of acid crystals still apparent. |
| 124 | 63 | Slight increase in moisture. |
| 128 | 93 | Same as above but edges beginning to dry. |
| 138 | 113 | Some acid still apparent, mixture drying. |
| 138 | 119 | Slightly more moisture appearing. |
| 142 | 135 | |
| 144 | 141 | No free acid apparent. |
| 146 | 148 | Lighter than closed bottle mix, and damp. |
| 170 | 168 | Taken out of oven and dried, much paler than closed bottle mixture (Ex. V). |

EXAMPLE V

The procedure of Example IV was repeated with the exception that the bottle containing the sugar-citric acid mixture was sealed prior to the application of heat thereto. The results of this reaction are summarized in Table V.

Table V.—Closed bottle test

| Temp. °F. | Elapsed Time (min.) | Comments |
|---|---|---|
| 76 | 0 | The temperature of the mix was taken on initial dry ingredients at room temperature. |
| 90 | 8 | Slight moisture appearing in mixture. |
| 98 | 13 | Slightly more moisture appearing. |
| 105 | 18 | Do. |
| 110 | 23 | Slight increase in moisture throughout. |
| 110 | 28 | Slight increase in moisture throughout, acid crystals disappearing. |
| 110 | 35 | More acid crystals disappearing. |
| 118 | 43 | Slight increase in moisture, no apparent free acid. |
| 124 | 63 | Slight increase in moisture, no apparent free acid. |
| 124 | 71 | No change. |
| 124 | 76 | No change, temperature increased. |
| 128 | 93 | Very slight increase in moisture. |
| 132 | 101 | Increased slightly in moisture content. |
| 134 | 105 | Do. |
| 138 | 111 | Slight sticking to bottom of bottle. |
| 142 | 129 | Slight increase in moisture content. |
| 144 | 140 | Do. |
| 146 | 146 | Do. |
| 150 | 153 | Slight increase in moisture content, color getting darker. |
| 170 | 166 | Moisture content increased, lumps appearing in mixture—removed from heating zone, dried. |

It is apparent from Examples IV and V that the product obtained by heating the citric acid and sucrose in a closed vessel was substantially more homogeneous in character than in analogous product obtained by heating the materials in an open vessel, and contained little, if any, free citric acid. The product obtained by heating the reactants in an open vessel was somewhat heterogeneous in nature and contained appreciable free citric acid. The product of the open vessel is, however, quite useful in the formation of effervescent drink concentrates, particularly when employed in conjunction with the sodium bicarbonate-disaccharide complexes described hereinafter. The products produced by the open vessel are somewhat softer and finer in character, are composed of smaller granules and are distinctly paler. It is believed that this result is a consequence of the loss of moisture during the heat treatment and therefore less levulose formation.

EXAMPLE VI

A mixture consisting of 15 parts by weight of citric acid monohydrate and 15 parts by weight of anhydrous citric acid was intimately mixed with 50 parts of dry dyed sucrose and placed in a closed vessel. The closed vessel was then placed in an oven maintained at a temperature of about 250° F. until the internal temperature of the citric acid-sucrose mixture had raised to about 220° F. at which point it was apparent that a satisfactory reaction product had been obtained. The closed vessel was then removed from the oven and the contents thereof which were damp and semi-plastic were placed in an open container and allowed to cool at room temperature. The product of the reaction contained somewhat less moisture than the similar product obtained in Example I wherein the citric acid employed was entirely in the form of the hydrate. The product obtained became hard and dry quickly and was passed through a ten mesh screen to produce granules of uniform size.

It was noted that in the course of this experiment better dispersion of the moisture present was obtained than in the analogous experiment described in Example I wherein citric acid solely in the form of the hydrate was employed. Furthermore, the product appeared to be less reactive under the conditions than did the product obtained in Example I and hence less precise control was necessary.

EXAMPLE VII

When 50 parts of dry dyed maltose are substituted for sucrose in the experiment described in Example I rather than sucrose, a product similar to that described in Example I is obtained.

EXAMPLE VIII

When 50 parts of dry dyed mellibiose are substituted for sucrose in the process of Example I, a product similar to that described in Example I is obtained.

EXAMPLE IX

Substitution of 18 parts of dl-tartaric acid monohydrate for citric acid monohydrate in the experiment described in Example I will yield a product analogous to that described in Example I.

EXAMPLE X

A crystalline disaccharide-acid complex is obtained when 15 parts of malic acid, 50 parts of dry dyed lactose, and 1 part of water are intimately mixed and placed in a closed vessel. The vessel is then placed in an oven which was maintained at a temperature of about 260° F. and maintained therein until the temperature of the acid-sugar mixture had raised to about 180° F. The damp and semi-plastic product is placed in an open container and allowed to cool and dry at room temperature.

EXAMPLE XI

When the experiment described in Example IX is repeated with the exception that 50 parts of trehalose were employed rather than sucrose, a product similar to that described in Example I is obtained.

EXAMPLE XII 20 parts of anhydrous citric acid, 50 parts of dry dyed sucrose and 2 parts of water were placed in a closed vessel. The closed vessel was then placed in an oven maintained at a temperature of about 260° F. and retained therein until the temperature of the acid-sugar mixture had raised to about 170° F. The closed vessel was then removed from the oven and the damp, semi-plastic contents thereof were spread in an open pan and permitted to cool and dry at room temperature. The reaction product became hard, dry and crystalline in a few minutes and was reduced to particles of uniform size by passage through a ten mesh screen.

EXAMPLE XIII

The dried screened product obtained in Example I was placed in an open pan in an electric oven for several minutes until it was rendered semi-moist in character. The material was then removed from the oven and allowed to crystallize at room temperature to a hard uniform product. The speed of crystallization was about 25 times faster than that of the material when first removed from the first reaction vessel.

THE CARBONATE-DISACCHARIDE COMPLEX

There are two primary objects of this portion of the invention. The first is to convert carbonates to a dry form stable in the presence of organic acids and of the other dry ingredients of the effervescent drink compositions of the invention. The second object is the production of carbonates in such form that when added to water in conjunction with organic acids or with the other ingredients of the drink compositions of this invention, a fairly constant release of carbon dioxide to the drink solution for a period of several minutes will be produced. Such a result is in contrast with that obtained from unmodified carbonates, which demonstrate an almost instantaneous release of carbon dioxide in organic acid containing solutions.

It has been discovered that these objects may be achieved by subjecting a mixture of a disaccharide and an inorganic carbonate in the presence of a small quantity of water, to a temperature of from about 125° F. to about 280° F. for a period of from about 5 to 30 minutes.

Carbonates and disaccharides may be combined in a wide range of proportions in the formation of the carbonate-disaccharide complexes of this invention. Preferably a mixture containing from about 65% to about 95% by weight of a disaccharide, with the balance carbonate is employed.

Water in an amount equal to from about 3% to about 30% of the combined weight of the disaccharide and carbonate may be employed. A preferable quantity of water is from about 2% to about 10% of the combined weight of the disaccharide and carbonate.

As indicated by the following examples, the solubility of the disaccharide-carbonate complexes is a function of the amount of the water utilized in the formulation thereof. As the initial percentage of water is increased, the solubility of the carbonate-disaccharide complex granules is decreased. Thus, as indicated by Example XVIII, sucrose-sodium bicarbonate complex granules formulated by the utilization of about 28% by weight of initial water may require 20 minutes or more to dissolve in a solution containing a citric acid-sucrose complex of this invention. It is possible therefore to produce carbonate-disaccharide complexes of varying degrees of solubility, and to utilize a mixture of such complexes in the formation of the ultimate beverage concentrates of this invention, whereby substantial effervescence may be imparted to the drink produced over an extended period of time. Such procedure is not essential, however, inasmuch as sustained effervescence for a period of at least several minutes results from the use of any of the carbonate-disaccharide complexes of this invention.

The optimum heating time for the formation of the carbonate-disaccharide complexes varies inversely with the temperatures. At the upper limits of the temperature range, heating of the disaccharide-carbonate mixture for a period of about five minutes is sufficient, whereas at lower temperatures longer periods of heating are required. Those skilled in the art will be readily able to determine the proper time-temperature relationship for any particular mixture it is desired to employ.

The reaction mixture is preferably heated in a substantially inert atmosphere to preclude adverse color change of the dyed sugar which might be effected in the presence of the basic carbonate present. Furthermore, adverse effects of oxidation upon the ingredients are in this manner precluded. The examples demonstrate satisfactory results which have been obtained merely by heating the reaction mixture in a closed container whereby effects of atmospheric conditions are precluded.

Preferably, the carbonate-disaccharide mixtures should not be permitted to remain in the open air for extended periods of time after the addition of the required moisture. If this precaution is not observed, the adverse effect of the carbonate on the dye present in the sugar may proceed to an undesirable degree.

Substantially all inorganic carbonates are useful in the invention. Alkali metal bicarbonates and particularly sodium bicarbonate are preferred. Carbonates and bicarbonates of the alkaline earth metals are also particularly suitable. Barium carbonates, which are poisonous of course, may not be employed in the formation of complexes to be used in the preparation of beverages. In addition, the carbonates of metals whose salts have been found to be useful for therapeutic purposes, such as strontium, magnesium, iron and the like may also be employed.

The disaccharides are generically useful in the formation of the carbonate-disaccharide complexes of this invention. Thus, all of the various disaccharides including those discussed in detail in the foregoing portions of this specification may be employed. Sucrose is preferred.

The following examples are illustrative of the preparation of the carbonate-disaccharide complexes of this invention. All parts are by weight unless otherwise indicated.

EXAMPLE XIV 11.1 parts of sodium bicarbonate, 50 parts of dry, dyed sucrose, and two parts of water were mixed together to form a doughy, semi-plastic material. The semi-plastic mixture was then placed in a closed container and heated to a temperature of about 165° F. for a period of about 30 minutes. The product was then removed from the container and air dried.

An examination of the product revealed the absence of free or uncombined sodium bicarbonate. It was apparent that physical and chemical combination had occurred. The product was crystalline and homogeneous when dry.

EXAMPLE XV

The experiment described in Example XIV was repeated with the exception that only 25 parts of sucrose were employed, and the mixture was heated at a temperature of about 165° for a period of about ten minutes.

The crystalline product obtained was quite similar to that obtained in Example XIV. In this instance likewise, no free or uncombined sodium bicarbonate was detected in the product.

EXAMPLE XVI

The experiment described in Example XIV was repeated with the exception that 100 parts of sucrose, and 5 parts of water were employed. The mixture was heated at a temperature of about 220° F. for a period of about 20 minutes. The product obtained was similar in appearance to that described in Example XIV. The product was somewhat harder however and required a longer time to dissolve when added to water in conjunction with a sugar-citric acid complex.

EXAMPLE XVII

The experiment described in Example XVI was repeated with the exception that about 20 parts of water were employed. The product obtained was appreciably harder than that described in Example XIV and required a much greater period of time to dissolve when added to water in conjunction with a citric acid-sucrose complex.

EXAMPLE XVIII

The experiment described in Example XVI was repeated with the exception that about 30 parts of water were employed. The product obtained was even harder than that described in Example XVII and required about 20 minutes to dissolve completely when added to water in conjunction with the citric acid-sucrose complex.

EXAMPLE XIX

The experiment of Example XIV was repeated with the exception that about 150 parts of sugar and about 6 parts of water were employed and the mixture was heated for a period of about ten minutes at a temperature of about 265° F. The product obtained was quite similar in appearance to that of Example XIV although there was some free, uncombined sucrose present.

EXAMPLE XX

The experiment of Example XIV was repeated with the exception that about 175 parts of sugar and about 7 parts of water were employed and the mixture was heated at a temperature of about 280° F. for a period of about five minutes. A product similar to that described in Example XIX was obtained.

It will be noted that in the foregoing examples, it has been indicated that a physical and chemical combination of the bicarbonate and the sugar had been effected. That such a result was in fact achieved is demonstrated by the following example of comparative tests of mixtures of the sodium bicarbonate sucrose complexes of this invention and citric acid, and of simple mixtures of sodium bicarbonate, sucrose and citric acid.

EXAMPLE XXI

A sodium bicarbonate-sugar complex was prepared by mixing 77.6 parts of sucrose, 7.4 parts of sodium bicarbonate and 7.0 parts of water, and heating the mixture in a closed vessel to a temperature of about 245° F. for a period of about twenty minutes. The sodium bicarbonate-sugar complex was then air dried and mixed with an equal amount of citric acid monohydrate. This inordinate amount of citric acid monohydrate was intentionally used in an effort to unbalance or break the stability of the sodium bicarbonate sugar granule. The acid-bicarbonate-complex mixture was placed in an open vessel and subjected to adverse conditions of higher summer temperatures and humidity for a period of one month. At the end of this time the mixture was tested and found to be highly reactive, extremely soluble, and to give the desired effervescent reaction upon addition to water.

For purposes of comparison, a simple mixture of untreated sugar, citric acid, and sodium bicarbonate in the same proportions was stored under the same conditions. Within twenty-four hours after this mixture had been compounded, and placed in the storage vessel, considerable reaction had occurred and the mixture had begun to fuse together. After one month the mass which was formed by the reaction of the acid and bicarbonate and sugar was found to demonstrate no effervescent action whatsoever. When added to water the mixture remained inert on the bottom of the vessel, and exhibited no reactivity and extremely poor stability.

Although the carbonate disaccharide complexes of this invention are stable in the presence of free, uncomplexed acids, as indicated by this example, such mixtures are not desirable beverage concentrates for the reason that the effervescence resulting from the addition thereof to water is not prolonged but rather is immediately dissipated. Mixtures of carbonate-disaccharide complexes and uncomplexed acids are however, quite useful in the formation of therapeutic compositions.

EXAMPLE XXII

When the experiment described in Example XIV is repeated with the exception that 11.5 parts of potassium bicarbonate were employed rather than sodium bicarbonate, a product is obtained which is similar to that described in Example XIV.

EXAMPLE XXIII

The experiment described in Example XXII may be repeated with the exception that calcium carbonate is substituted for potassium bicarbonate to produce an analogous product.

EXAMPLE XXIV

A disaccharide-carbonate complex of the type embraced by this invention is produced when 11.1 parts of sodium carbonate, 50 parts of dry dyed maltose and 2 parts of water are combined to form a dry mixture and this mixture is then placed in a closed container and heated at a temperature of about 170° F. for a period of about 30 minutes. The product is crystalline in nature and similar to that obtained in Example XIV.

EXAMPLE XXV

A disaccharide-carbonate complex may be formulated from magnesium carbonate and sucrose in the following manner. 15 parts of anhydrous magnesium carbonate and 50 parts of dry dyed sucrose are thoroughly mixed with about 15 parts of water. The mixture is then placed in a closed vessel and heated to a temperature of about 160° F. for a period of about 35 minutes. A hard crystalline material similar to that described in Example XVII is obtained.

EXAMPLE XXVI 11.5 parts of potassium bicarbonate, 50 parts of dry dyed gentiobiose and about 10 parts of water when thoroughly mixed and heated in a closed container at a temperature of about 180° F. for a period of about 25 minutes yields a product similar to that described in Example XXII.

FLAVOR-SUGAR COMPLEX

It is fundamental to the production of acceptable drinks to vary the basic acid-carbonate ratios with the flavors it is desired to produce and concurrently to maintain the acidity of the drinks sufficiently high to insure palatability of the drink after the neutralization reaction has occurred and until the drink is finally consumed. Consideration of these facts reveals the necessity for the preparation of a separate flavoring agent which may be added to any desired formulation of the previously described acid-disaccharide and carbonate-disaccharide complexes.

In accordance with this aspect of the invention, flavor-sugar complexes are prepared by adding the desired flavor concentrate to a relatively large quantity of dry, dyed sugar, thoroughly mixing the ingredients and placing the mixture in an inert atmosphere for a sufficient period of time to permit absorption of the flavor by the sugar. It has been discovered that powdered dry sugar more readily absorbs the flavor than the sugar in the granulated form. It has been further discovered that the flavor is most readily absorbed and stabilized in the sugar as the absorption is permitted to take place in the absence of heat. Furthermore, the quality of the flavor-sugar concentrate is enhanced by effecting the absorption of the sugar in a closed container, for the reason that the flavor vapor pressure is in equilibrium in such a closed container and a more thorough penetration of the sugar is consequently achieved.

Not only the disaccharides but all crystalline edible sugars may be employed in the formation of the flavor sugar complex. Hence, monosaccharides such as dextrose may be employed.

EXAMPLE XXVII 1 part of oil of lemon was added to 50 parts of powdered dry sucrose, thoroughly mixed and placed in a sealed container for a period of about 24 hours.

Upon removal from the container it was found that the oil of lemon had thoroughly permeated the sugar and that the flavor-sugar concentrate was uniform in quality and stable.

EXAMPLE XXVIII

The process of Example XV was repeated with the exception that root beer extract was substituted for lemon oil. The results obtained were analogous to those described in the foregoing example.

COMBINATION OF THE ACID-DISACCHARIDE, CARBONATE-DISACCHARIDE, AND FLAVOR-SUGAR COMPLEXES

In the foregoing portions of this application, there have been described methods for the production of acid-disaccharide complexes, carbonate-disaccharide complexes, and flavor-sugar complexes. In accordance with this invention, effervescent drink concentrates are produced by combining these three complexes to produce a dry beverage concentrate which, when added to a quantity of water, produces an effervescent drink having the desired color and flavor.

It is well recognized that there is a marked difference in the acidity of various types of soft drinks. Generally speaking, such drinks may be placed in three broad classes on the basis of the acidity present therein. The most acid drinks are those which have citrus fruit flavors. The taste of citrus fruits is primarily a consequence of the tartness or acidity of the fruit or of its synthetic counterpart.

A second group of drinks are those having various berry flavors such as strawberry, raspberry, cherry or grape. Such fruits are naturally less acid than citrus fruits, and therefore a less high degree of acidity is required to produce a satisfactory synthetic flavor.

A third group of drinks is almost flat in taste and contains acidity almost imperceptible to the palate. Such drinks are root beer, cream soda, sarsaparilla, and vanilla.

It has been discovered that approximately the following acid to carbonate ratios closely simulate the flavors indicated.

*Citrus and other highly acid flavors*

|  | Acid to Carbonate Ratio | |
| --- | --- | --- |
|  | (Citric acid) | (NaHCO$_3$) |
|  | Percent | Percent |
| Fruit Drinks: | | |
| Orange | | |
| Lemon | | |
| Lime | 66.46 | 35.54 |
| Lemon-Lime | | |
| Pineapple | | |
| Berry Drinks: | | |
| Strawberry | | |
| Raspberry | 62.87 | 37.13 |
| Cherry | | |
| Grape | 62.11 | 37.89 |
| Synthetic Flavors: | | |
| Cream Soda | 54.24 | 45.76 |
| Root Beer | | |

It is apparent from the foregoing that the most desirable acid-carbonate ratios vary with the various flavors it is desired to produce. Furthermore, the acidity of the drink must be sufficiently high to maintain the palatability of the drink after the effervescence has substantially subsided. Those skilled in the art will be easily able to formulate a suitable combination for any particular flavor from any of the various complexes of this invention.

As indicated in the foregoing, the complexes of this invention may be prepared from widely varying proportions of ingredients. Thus, carbonate and acid complexes may be prepared which contain substantially any desired relative amount of the acidic and basic ingredients. Furthermore, the amount of sugar present in the complexes may be varied widely. Hence, it is possible to prepare combinations of the complexes of this invention which contain any desired relative proportion of total acidic and basic ingredients. Likewise, there may be prepared from the complexes of this invention effervescent drink concentrates which contain sugar in an amount adequate to afford sufficient sweetness to the drink prepared. Alternatively, concentrates may be prepared which contain a minimum amount of sugar, in which case the consumer should add additional sugar to the drink at the time it is prepared. It will be noted that the total amount of dye present in concentrates containing such minimum quantities of sugar should be equivalent to that present in the concentrates containing adequate sugar for sweetness, so that sufficient color will be imparted to the drink.

The following examples are illustrative of the formation of drink concentrates from the complexes of this invention.

EXAMPLE XXIX

Sucrose-citric acid complexes were prepared containing various percentages of citric acid and sugar as indicated in Table VI.

Table VI.—Acid-disaccharide compositions for ten drinks—complex prepared from—

|     | Sucrose, grams | Citric Acid, grams | Percent Sugar | Percent Citric Acid |
| --- | --- | --- | --- | --- |
| I   | 25.0  | 18.9 | 57.0 | 43.0 |
| II  | 50.0  | 18.9 | 72.6 | 27.4 |
| III | 100.0 | 18.9 | 84.2 | 15.8 |
| IV  | 150.0 | 18.9 | 88.8 | 11.2 |
| V   | 175.0 | 18.9 | 90.3 | 9.7  |

Similarly, sucrose sodium bicarbonate complexes were prepared containing various proportions of the two ingredients as indicated in the following table.

Table VII.—Carbonate-disaccharide composition for ten drinks—complex prepared from—

|     | Sucrose, grams | Sodium Bicarbonate, grams | Percent Sugar | Percent NaHCO₃ |
| --- | --- | --- | --- | --- |
| I   | 25.0  | 11.1 | 69.0  | 31.0 |
| II  | 50.0  | 11.1 | 81.89 | 18.02 |
| III | 100.0 | 11.1 | 90.0  | 10.0 |
| IV  | 150.0 | 11.1 | 93.11 | 6.89 |
| V   | 175.0 | 11.1 | 94.03 | 5.97 |

Equal parts by weight of the complexes shown in the foregoing Tables VI and VII, were mixed to form drink concentrates suitable for the preparation of ten drinks, as indicated in the following table.

Table VIII

| From Table VI. | | | | From Table VII. | | | |
| --- | --- | --- | --- | --- | --- | --- | --- |
| Ex. | Acid plus | disaccharide | mixed with | Ex. | NaHCO₃ plus | disaccharide. | |
| I.   | 18.9 plus | 25.0  | mixed with | V.   | 11.1 plus | 175.0 |
| II.  | 18.9 plus | 50.0  | mixed with | IV.  | 11.1 plus | 150.0 |
| III. | 18.9 plus | 100.0 | mixed with | III. | 11.1 plus | 100.0 |
| IV.  | 18.9 plus | 150.0 | mixed with | II.  | 11.1 plus | 50.0 |
| V.   | 18.9 plus | 175.0 | mixed with | I.   | 11.1 plus | 25.0 |

It will be noted that in each of the exemplified mixes, the total quantity of acid, carbonate and sugar remains the same. The requisite flavor complex for these acid to carbonate ratios may be added to any of the mixes disclosed. Other possible combinations of the complexes listed in Tables VI and VII may be utilized. Examples of such additional combinations are shown in Table IX.

Table IX

| Acid-disaccharide granules composed of; grams— | | | NaHCO₃-disaccharide granules composed of; grams— | | |
| --- | --- | --- | --- | --- | --- |
| Ex. | Acid plus | sucrose | mixed with NaHCO₃ plus | sucrose. |
| I.   | 18.9 plus | 25.0  | mixed with 11.1 plus | 25.0 |
| II.  | 18.9 plus | 50.0  | mixed with 11.1 plus | 50.0 |
| III. | 18.9 plus | 100.0 | mixed with 11.1 plus | 100.0 |

It is apparent from the foregoing that the complexes of this invention make possible the production of drinks containing widely varying relative amounts of sugar, acid, carbonate, and flavor. When added to water, all of these various combinations produce highly palatable drinks which demonstrate a continuing effervescence.

The following example is illustrative of a drink concentrate containing a minimum amount of sugar whereby bulk is reduced and package and handling costs may be decreased. Approximately one tablespoon of sugar per 8 oz. drink should be added at the time of preparation of the drink.

EXAMPLE XXX

A citric acid sucrose complex formulated from 18.9 parts of citric acid monohydrate and 25 parts of sucrose was combined with equal parts of a sodium bicarbonate-sucrose complex, prepared from 11.1 parts of sodium bicarbonate and 25 parts of sucrose. An appropriate amount of flavor-sugar complex formulated from one part of strawberry flavor and 20 parts of sugar was also included in the mixture. 100 parts (about 4 oz.) of this mixture is sufficient to produce 10 8 oz. drinks.

EXAMPLE XXXI

A maltose-tartaric acid complex such as that prepared from 50 parts of dry dyed maltose, 15 parts by weight of tartaric acid and 1 part of water, and a potassium bicarbonate-maltose complex such as that prepared from 11.5 parts of potassium bicarbonate, 50 parts of dry dyed maltose and 2 parts of water, when combined in approximately equal proportions with 2.7 parts of a grape flavor-sugar complex, upon addition to an appropriate amount of water, will produce a brightly colored, highly palatable and delicious drink characterized by a continued effervescence.

EXAMPLE XXXII

When the complexes described in Example XXXI are formed from mellibiose rather than maltose, results analogous to those described in Example XXXI are obtained.

EXAMPLE XXXIII

When the complexes described in Example XXXI are prepared from calcium carbonate rather than potassium bicarbonate, the results obtained were analogous to those described in Example XXXI. The beverage however demonstrates a slight cloudiness.

The following examples are offered to illustrate more fully the production of various citrus, berry and synthetic drink concentrates in accordance with this invention. They are offered merely as an indication of the most satisfactory relative proportions of ingredients which have been discovered for use in the production of various types of drinks mentioned.

EXAMPLE XXXIV

[Citrus fruit flavors—10 drink basis.]

| Weight of Ingredients Used (grams) | | Ingredient Percentage |
| --- | --- | --- |
| Sugar (Sucrose) | 250.0 | 87.84 |
| Citric Acid Monohydrate | 22.0 | 7.73 |
| NaHCO₃ | 11.1 | 3.9 |
| Dye (F. D. & C. Persian Orange, May Green, or Tartrazine Yellow #5) | 0.5 | 0.53 |
| Flavor (Orange, Lemon, or Lime Oils) | 1.0 | |

Approximately 1 oz. per drink (28.4 grams) of the above mix when added to an 8 oz. glass of water produced a delicious, brightly colored drink with a continuing effervescence.

EXAMPLE XXXV

[10 drinks—pineapple drink.]

| Weight of Ingredients Used (grams) | | Ingredient Percentage |
|---|---|---|
| Sugar (Sucrose) | 250.0 | 87.84 |
| Citric Acid. 1H$_2$O | 22.0 | 7.73 |
| NaHCO$_3$ | 11.1 | 3.9 |
| Tartrazine Yellow | 0.25 | |
| Pineapple Flavor | 1.25 | 0.53 |

EXAMPLE XXXVI

[Berry flavors, strawberry, raspberry, and cherry.]

| Weight of Ingredients Used (grams) | | Ingredient Percentage |
|---|---|---|
| Sugar (Sucrose) | 250.0 | 88.6 |
| Citric Acid. 1H$_2$O | 18.9 | 6.4 |
| NaHCO$_3$ | 11.1 | 3.9 |
| Dye and Flavor | 2.5 | 0.9 |

EXAMPLE XXXVII

[Grape drink—10 drinks.]

| Weight of Ingredients Used (grams) | | Ingredient Percentage |
|---|---|---|
| Sugar (Sucrose) | 250.0 | 88.7 |
| Citric Acid. 1H$_2$O | 18.2 | 6.3 |
| NaHCO$_3$ | 11.1 | 3.9 |
| Color and Flavor | 2.7 | 1.0 |

EXAMPLE XXXVIII

[Root beer and cream soda drinks—10 drinks]

| Weight of Ingredients Used (grams) | | Ingredient Percentage |
|---|---|---|
| Sugar (Sucrose) | 250.0 | 90.71 |
| Citric Acid. 1H$_2$O | 13.1 | 4.76 |
| NaHCO$_3$ | 11.1 | 4.03 |
| Color and Flavor | 1.4 | 0.5 |

Hereinbefore the utilization of the various complexes of this invention in the formation of effervescent confectionery drinks has been stressed. It is to be understood, however, that these complexes may be employed without the flavoring materials and in conjunction with medicinal agents if so desired. Hence, therapeutic preparations may be formulated which embrace as essential ingredients the complexes of this invention.

It should also be understood that the various complexes may be individually employed for numerous purposes if it be so desired. It has been noted for example that the disaccharide-acid complexes of this invention are characterized by remarkable stability against deterioration by oxidation and furthermore that there is imparted by such complexes to the flavoring and coloring materials incorporated therewith, a similar resistance to oxidation deterioration. It is therefore apparent that these disaccharide-acid complexes may be employed as antioxidants.

We claim:

1. An effervescent beverage concentrate comprising a mixture of an organic acid-diaccharide complex and an inorganic carbonate-disaccharide complex, said acid-disaccharide complex being prepared by raising the temperature of a mixture of an organic acid and a disaccharide containing an amount of water equal to from about 5% to about 15% of the weight of the acid present to a temperature of from about 125° F. to about 250° F.; said carbonate-disaccharide complex being prepared by subjecting a mixture of an inorganic carbonate and a disaccharide, containing from about 3% to about 30% of water based on the total weight of the carbonate-disaccharide mixture to a temperature of from about 125° F. to about 280° F. for a period of from about 5 to about 30 minutes.

2. The effervescent drink concentrate of claim 1 wherein the disaccharide employed in the formation of the complexes is sucrose.

3. The effervescent drink concentrate of claim 1 wherein the acid employed in the formation of the organic acid-disaccharide complex is citric acid.

4. The effervescent drink concentrate of claim 1 wherein the carbonate employed in the formation of the inorganic carbonate-disaccharide complex is a bicarbonate.

5. The effervescent drink concentrate of claim 1 wherein the carbonate employed in the formation of the inorganic carbonate-disaccharide complex is sodium bicarbonate.

6. The effervescent drink concentrate of claim 1 wherein the organic acid-disaccharide complex is a citric acid-sucrose complex and the inorganic carbonate-disaccharide complex is a sodium bicarbonate-sucrose complex.

7. The effervescent drink composition of claim 1 in which the disaccharide complexes are formulated from dyed disaccharides.

8. The effervescent drink composition of claim 1 containing a flavoring material.

9. The effervescent drink composition of claim 8 in which the flavoring agent is a flavored sugar.

10. The effervescent drink composition of claim 8 in which the flavored sugar is flavored sucrose.

11. A process for the production of an organic acid-disaccharide complex which comprises raising the temperature of a carbonate-free mixture consisting essentially of an organic acid and a disaccharide containing water in an amount equal to from about 5% to about 15% of the weight of the acid present to a temperature of from about 125° F. to about 250° F.

12. The process of claim 11 wherein the water present in the reaction mixture is water of hydration of the acid utilized.

13. The process of claim 11 wherein the disaccharide employed is sucrose.

14. The process of claim 11 wherein the acid employed is citric acid.

15. The process of claim 11 wherein the ratio of acid to disaccharide is from equal parts by weight of each ingredient to about one part by weight of acid to about 5 parts by weight of disaccharide.

16. The product produced according to the process of claim 11.

17. The process of preparing an inorganic carbonate disaccharide complex which comprises subjecting an acid free mixture consisting essentially of a disaccharide and an inorganic carbonate containing water in an amount equal to from about 3% to about 30% of the combined weight of the disaccharide and the carbonate to a temperature of from about 125° F. to about 280° F.

18. The process of claim 17 wherein the carbonate-disaccharide reaction mixture contains from about 65% to about 95% by weight of disaccharide.

19. The process of claim 17 wherein the carbonate is sodium bicarbonate.

20. The product produced according to the process of claim 17.

21. The process of claim 17 wherein water in an amount equal to from about 2% to about 10% of the combined weight of the disaccharide and the carbonate is employed.

22. The process of claim 17 wherein the disaccharide employed is sucrose.

23. The process which comprises heating a carbonate-free mixture consisting essentially of an organic acid and a disaccharide to a temperature requisite to effect inversion of the disaccharide in the presence of such an amount of water that a partial inversion of the disaccharide is effected on the surfaces only of the crystals thereof to produce monosaccharides to bind said acid to said surfaces.

24. The process of claim 23 effected at a temperature of from about 125° F. to about 250° F.

25. The process of claim 23 in which water in an amount equal to from about 5% to about 15% of the weight of the acid present is employed.

26. The process of claim 23 in which the disaccharide employed is sucrose.

27. The process of claim 26 in which the acid employed is citric acid.

28. An effervescent beverage concentrate comprising the product produced according to the process of claim 17.

JOSEPH G. ALTHER.
PRUDENCE M. VAN ARSDELL.

REFERENCES CITED

The following references are of record in the file of this patent:

UNITED STATES PATENTS

| Number | Name | Date |
| --- | --- | --- |
| 109,990 | Zinsser | Dec. 6, 1870 |
| 169,830 | Mussgiller et al. | Nov. 9, 1875 |
| 362,727 | Divine | May 10, 1887 |
| 362,728 | Divine | May 10, 1887 |
| 1,450,865 | Pelc | Apr. 3, 1923 |